US011619742B2

United States Patent
Murakami

(10) Patent No.: US 11,619,742 B2
(45) Date of Patent: Apr. 4, 2023

(54) LINE BEAM SCANNING OPTICAL SYSTEM AND LASER RADAR

(71) Applicant: Panasonic Intellectual Property Management Co., Ltd., Osaka (JP)

(72) Inventor: Kimihiro Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 17/318,971

(22) Filed: May 12, 2021

(65) Prior Publication Data

US 2021/0278542 A1 Sep. 9, 2021

Related U.S. Application Data

(63) Continuation of application No. PCT/JP2019/039648, filed on Oct. 8, 2019.

(30) Foreign Application Priority Data

Dec. 26, 2018 (JP) .............................. JP2018-243644

(51) Int. Cl.
*G01C 3/08* (2006.01)
*G01S 17/89* (2020.01)
(Continued)

(52) U.S. Cl.
CPC .............. *G01S 17/89* (2013.01); *G01S 7/484* (2013.01); *G01S 7/4817* (2013.01); *G01S 17/931* (2020.01)

(58) Field of Classification Search
CPC ........ G01S 17/89; G01S 7/4817; G01S 7/484; G01S 17/931; G01S 7/4815; G02B 26/10
See application file for complete search history.

(56) References Cited

U.S. PATENT DOCUMENTS 5,153,768 A * 10/1992 Appel ................ G06K 15/1257
250/236
2002/0195496 A1* 12/2002 Tsikos .................... B82Y 15/00
235/462.01

(Continued)

FOREIGN PATENT DOCUMENTS

JP       H05-205199 A     8/1993
JP       H10-325872 A    12/1998
(Continued)

OTHER PUBLICATIONS

International Search Report issued in corresponding International Patent Application No. PCT/JP2019/039648, dated Dec. 3, 2019, with English translation.

*Primary Examiner* — Samantha K Nickerson
(74) *Attorney, Agent, or Firm* — McDermott Will & Emery LLP

(57) ABSTRACT

A line beam scanning optical system includes: a plurality of laser light sources disposed so as to be aligned in a direction corresponding to a long side of a line beam; an optical deflector; a first cylindrical lens configured to converge laser light from the plurality of laser light sources, into substantially parallel light in a direction perpendicular to an alignment direction in which the laser light sources are aligned, and to cause the laser light to be incident on a mirror; and a second cylindrical lens configured to condense the laser light from the plurality of laser light sources, in the alignment direction in which the laser light sources are aligned, and to cause the laser light to be incident on the mirror. The plurality of laser light sources are disposed at positions shifted from a focal position on the laser light source side of the second cylindrical lens.

21 Claims, 11 Drawing Sheets

(51) Int. Cl.
　　　*G01S 17/931*　　(2020.01)
　　　*G01S 7/481*　　(2006.01)
　　　*G01S 7/484*　　(2006.01)

(56) References Cited

U.S. PATENT DOCUMENTS

| | | | |
|---|---|---|---|
| 2014/0158771 A1* | 6/2014 | Ohi | G02B 26/10 |
| | | | 235/462.32 |
| 2016/0125906 A1* | 5/2016 | Yamada | G11B 7/0065 |
| | | | 369/103 |
| 2019/0025409 A1 | 1/2019 | Kawazoe et al. | |

FOREIGN PATENT DOCUMENTS

| | | |
|---|---|---|
| JP | 2000-098191 A | 4/2000 |
| JP | 2008-028019 A | 2/2008 |
| JP | 2017-150990 A | 8/2017 |
| JP | 2018-025606 A | 2/2018 |

* cited by examiner

θp = FULL WIDTH AT HALF MAXIMUM/2

$\theta p = 1/e^2$
FULL WIDTH $\theta p$ = FULL WIDTH
AT HALF MAXIMUM $\theta p$ = FULL WIDTH
AT HALF MAXIMUM/2

SLOW AXIS DIRECTION

SLOW AXIS DIRECTION

LINE BEAM SCANNING OPTICAL SYSTEM AND LASER RADAR

CROSS REFERENCE TO RELATED APPLICATION

This application is a continuation of International Application No. PCT/JP2019/39648 filed on Oct. 8, 2019, entitled "LINE BEAM SCANNING OPTICAL SYSTEM AND LASER RADAR", which claims priority under 35 U.S.C. Section 119 of Japanese Patent Application No. 2018-243644 filed on Dec. 26, 2018, entitled "LINE BEAM SCANNING OPTICAL SYSTEM AND LASER RADAR". The disclosure of the above applications is incorporated herein by reference.

BACKGROUND OF THE INVENTION

1. Field of the Invention

The present invention relates to a line beam scanning optical system for generating a line beam that is long in one direction and performing scanning with the line beam in a short side direction thereof, and a laser radar for detecting an object by using the line beam scanning optical system.

2. Disclosure of Related Art

To date, laser radars that detect objects using laser light have been developed in various fields. For example, in a vehicle-mounted laser radar, laser light is projected from the front of the vehicle, and whether or not an object such as a vehicle exists in front of the vehicle is determined on the basis of the presence/absence of reflected light of the laser light. Moreover, the distance to the object is measured on the basis of the projection timing of the laser light and the reception timing of the reflected light.

Japanese Laid-Open Patent Publication Nos. H05-205199 and 2017-150990 each disclose a device for detecting an obstacle in front of a vehicle by performing scanning with a linear beam.

In the laser radar having the above configuration, it is necessary to increase the light emission power of a light source in the case of detecting an object at a longer distance and a wider angle. As a method for this, a method of disposing a plurality of laser light sources such that the laser light sources are aligned can be used. However, in this method, there is a gap between the adjacent laser light sources, so that the laser light emitted from each laser light source may be separated on a line beam. In this case, the intensity distribution of the line beam may become non-uniform, and there is a possibility that an object cannot be detected stably.

SUMMARY OF THE INVENTION

A first aspect of the present invention is directed to a line beam scanning optical system for generating a line beam that is long in one direction and performing scanning with the line beam in a short side direction of the line beam. The line beam scanning optical system according to this aspect includes: a plurality of laser light sources disposed so as to be aligned in a direction corresponding to a long side of the line beam; an optical deflector configured to displace a mirror on which laser light emitted from the plurality of laser light sources is incident, and to deflect the line beam in the short side direction; a first cylindrical lens configured to converge the laser light emitted from the plurality of laser light sources, into substantially parallel light in a direction perpendicular to an alignment direction in which the laser light sources are aligned, and to cause the laser light to be incident on the mirror; and a second cylindrical lens configured to condense the laser light emitted from the plurality of laser light sources, in the alignment direction in which the laser light sources are aligned, and to cause the laser light to be incident on the mirror. The plurality of laser light sources are disposed at positions shifted from a focal position on the laser light source side of the second cylindrical lens.

In the line beam scanning optical system according to this aspect, since the plurality of laser light sources are used, the amount of the laser light applied to a target region can be increased. In addition, since the plurality of laser light sources are disposed at positions shifted from the focal position on the laser light source side of the second cylindrical lens, each laser light that has passed through the second cylindrical lens spreads in the alignment direction in which the laser light sources are aligned, and overlaps each other. Accordingly, the intensity distribution in the long side direction of the line beam can be made uniform.

A second aspect of the present invention is directed to a laser radar. The laser radar according to this aspect includes the line beam scanning optical system according to the first aspect and a light receiving optical system configured to receive reflected light, from an object, of laser light projected from the line beam scanning optical system.

Since the laser radar according to this aspect includes the line beam scanning optical system according to the first aspect, the amount of the line beam applied can be increased, and the intensity distribution in the long side direction of the line beam can be made uniform. Therefore, an object can be detected at a longer distance and a wider angle, and an object can be stably detected at all positions on the line beam.

A third aspect of the present invention is directed to a line beam scanning optical system for generating a line beam that is long in one direction and performing scanning with the line beam in a short side direction of the line beam. The line beam scanning optical system according to this aspect includes: a plurality of laser light sources disposed so as to be aligned in a direction corresponding to a long side of the line beam; an optical deflector configured to displace a mirror on which laser light emitted from the plurality of laser light sources is incident, and to deflect the line beam in the short side direction; a first cylindrical lens configured to converge the laser light emitted from the plurality of laser light sources, into substantially parallel light in a direction perpendicular to an alignment direction in which the laser light sources are aligned, and to cause the laser light to be incident on the mirror; and a second cylindrical lens configured to condense the laser light emitted from the plurality of laser light sources, in the alignment direction in which the laser light sources are aligned, and to cause the laser light to be incident on the mirror. The mirror has a long shape in one direction and is disposed such that a longitudinal direction of the shape is parallel to a direction corresponding to the alignment direction.

In the line beam scanning optical system according to this aspect, since the plurality of laser light sources are used, the amount of the laser light applied to a target region can be increased, similar to the first aspect. Here, in the case where the plurality of laser light sources are disposed in the optical system, the shape of the beam generated by condensing each laser light has a long shape in a direction corresponding to the alignment direction in which the laser light sources are aligned, on the mirror. In this regard, in the line beam scanning optical system according to this aspect, since the shape of the mirror is long in the direction corresponding to the alignment direction of the laser light sources as described above, a wasted region where the beam is not incident can be inhibited from occurring in the mirror, and the beam can be properly received by a mirror having a small area. Therefore, the weight of the mirror can be reduced, and the beam can be deflected stably and smoothly.

BRIEF DESCRIPTION OF THE DRAWINGS

The above and other objects and new features of the present invention will be fully clarified by the following description of the embodiment, when read in conjunction with accompanying drawings.

It should be noted that the drawings are solely for description and do not limit the scope of the present invention by any degree.

DESCRIPTION OF THE PREFERRED EMBODIMENTS

Hereinafter, an embodiment of the present invention will be described with reference to the drawings. For convenience, in each drawing, X, Y, and Z axes that are orthogonal to each other are additionally shown. The X-axis direction and the Y-axis direction are the long side direction and the short side direction of a line beam, respectively, and the Z-axis positive direction is a projection direction in which the line beam is projected.

Figure 1A:
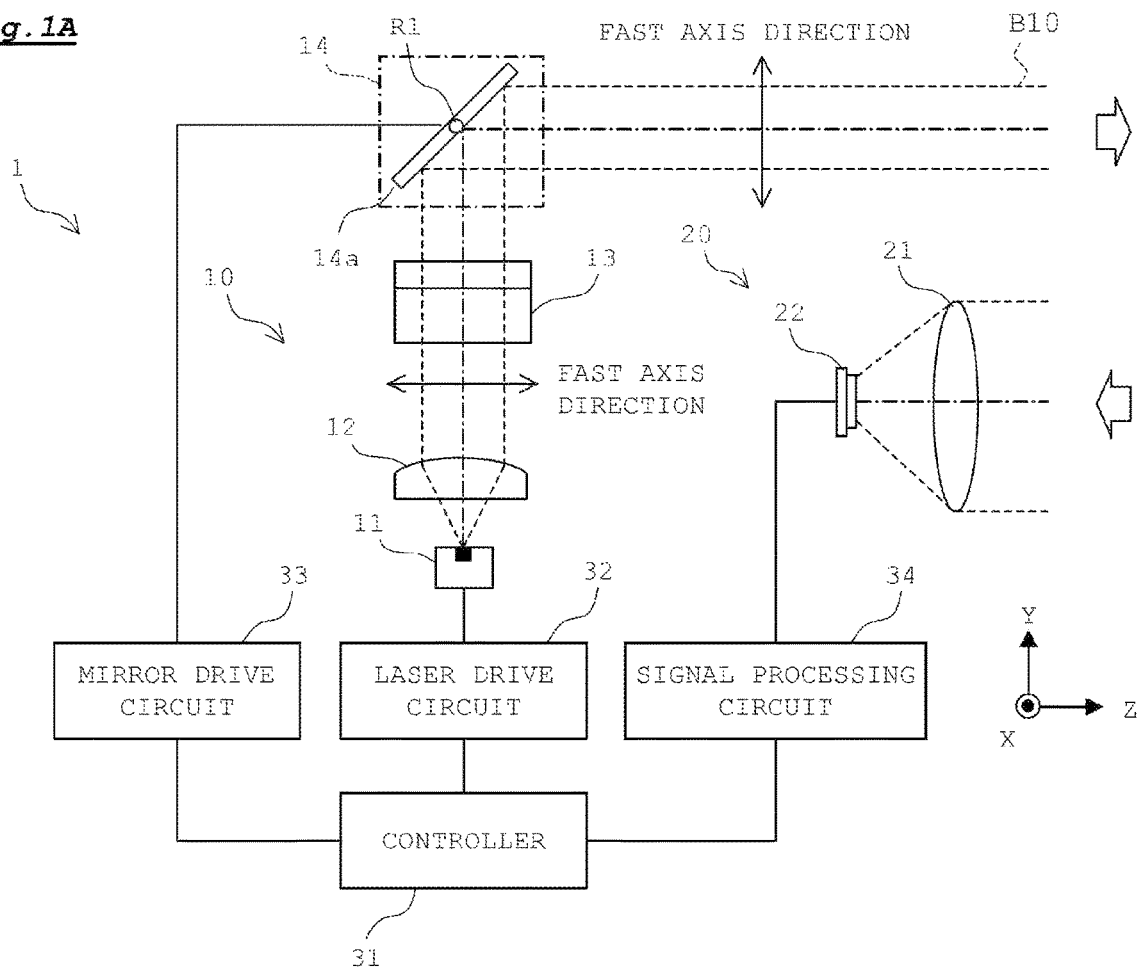
FIG. 1A is a diagram showing configurations of an optical system and a circuitry of a laser radar according to an embodiment.
Figure 1B:
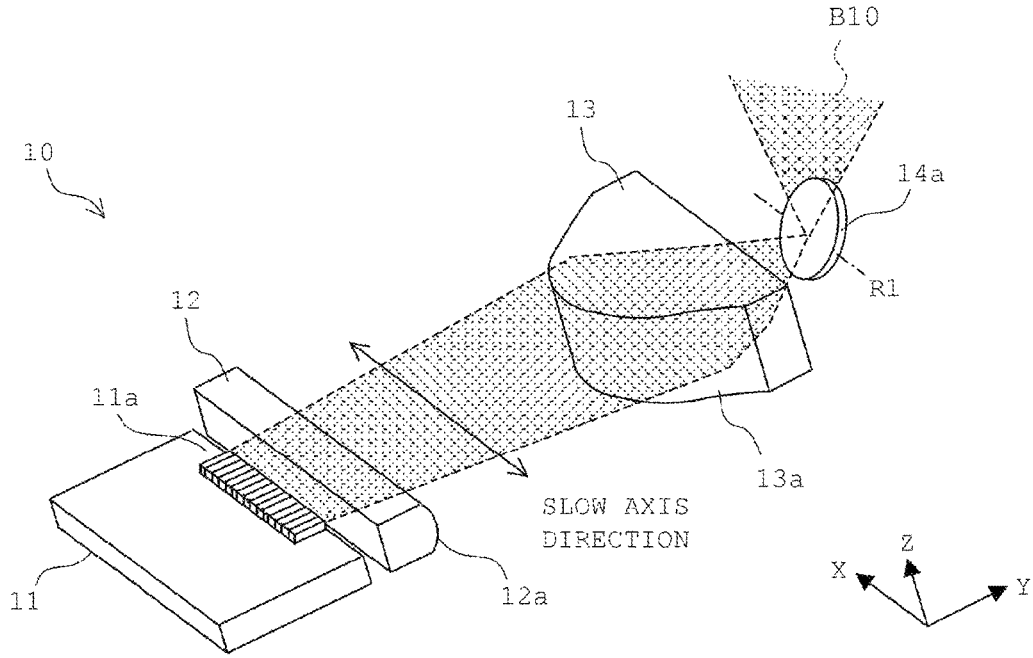
FIG. 1B is a perspective view showing a configuration of a line beam scanning optical system according to the embodiment.

FIG. 1A is a diagram showing configurations of an optical system and a circuitry of a laser radar 1. FIG. 1B is a perspective view showing a configuration of a line beam scanning optical system 10.

The laser radar 1 includes the line beam scanning optical system 10 and a light receiving optical system 20 as components of the optical system thereof. The line beam scanning optical system 10 generates a line beam B10 that is long in one direction (X-axis direction) and performs scanning with the line beam B10 in the short side direction thereof (Y-axis direction). The light receiving optical system 20 receives reflected light, from an object, of laser light projected from the line beam scanning optical system 10.

The line beam scanning optical system 10 includes a light source array 11, a fast axis cylindrical lens 12, a slow axis cylindrical lens 13, and an optical deflector 14. In addition, the light receiving optical system 20 includes a light receiving lens 21 and a light receiving element 22.

The light source array 11 is configured by integrating a plurality of laser light sources 11a. Each laser light source 11a emits laser light having a predetermined wavelength. The laser light source 11a is an end face-emitting laser diode. The laser light source 11a may be a surface-emitting laser light source. In the present embodiment, it is assumed that the laser radar 1 is mounted on a vehicle. Therefore, the emission wavelength of each laser light source 11a is set in the infrared wavelength band (for example, 905 nm). The emission wavelength of each laser light source 11a can be changed as appropriate according to the usage of the laser radar 1.

Figure 2A:
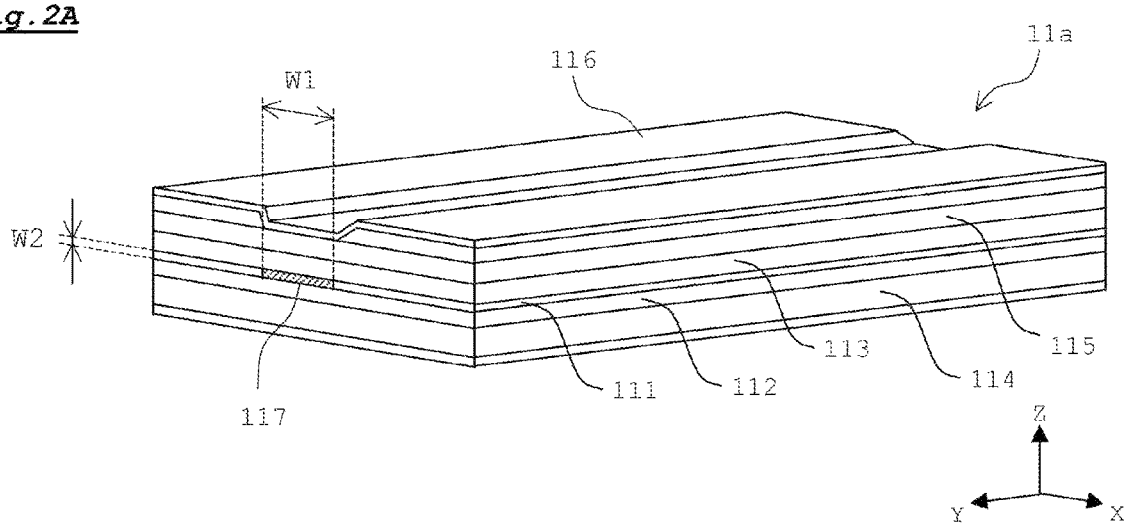
FIGS. 2A and 2B are each a perspective view showing a configuration of a laser light source according to the embodiment.
Figure 2B:
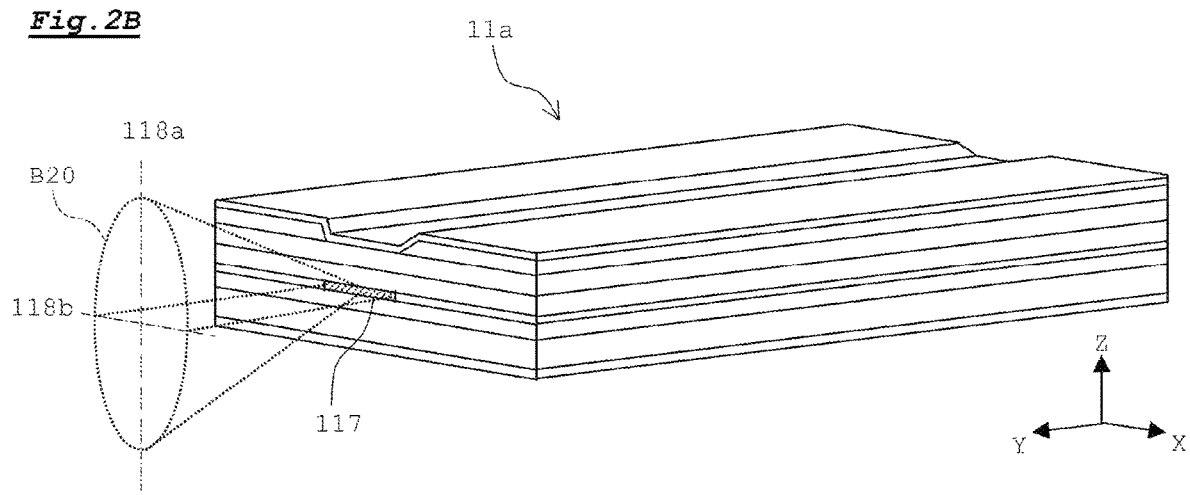
Figure 2C:
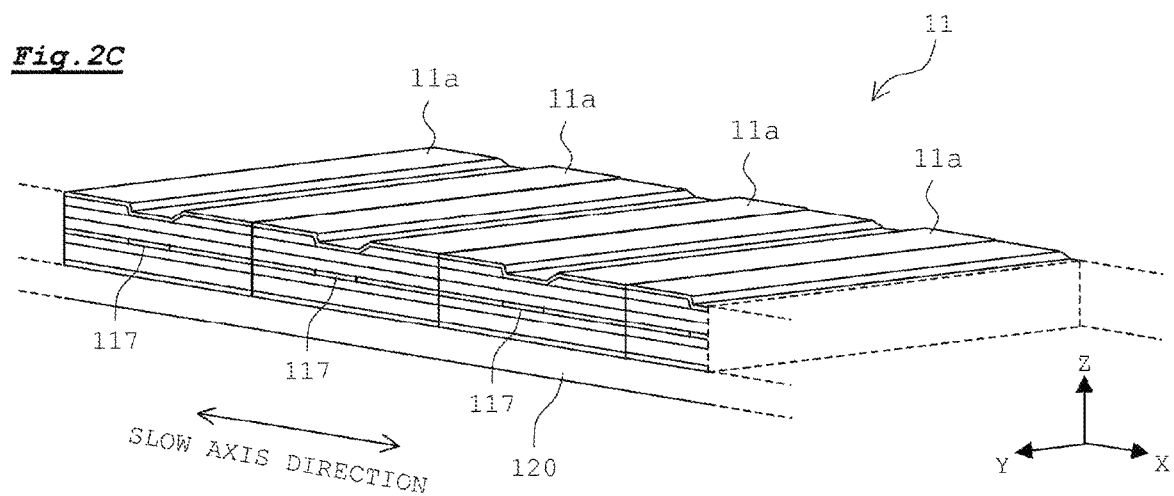
FIG. 2C is a perspective view showing a configuration of a light source array of the laser radar according to the embodiment.

FIG. 2A and FIG. 2B are each a perspective view showing a configuration of the laser light source 11a, and FIG. 2C is a perspective view showing a configuration of the light source array 11.

As shown in FIG. 2A, the laser light source 11a has a structure in which an active layer 111 is interposed between an N-type clad layer 112 and a P-type clad layer 113. The N-type clad layer 112 is laminated on an N-type substrate 114. In addition, a contact layer 115 is laminated on the P-type clad layer 113. When a current is applied to an electrode 116, laser light is emitted from a light emitting region 117 in the Y-axis positive direction. In general, in the light emitting region 117, a width W1 in a direction parallel to the active layer 111 is larger than a width W2 in a direction perpendicular to the active layer 111.

An axis in the short side direction of the light emitting region 117, that is, an axis in the direction (Z-axis direction) perpendicular to the active layer 111, is referred to as a fast axis, and an axis in the long side direction of the light emitting region 117, that is, an axis in the direction (X-axis direction) parallel to the active layer 111, is referred to as a slow axis. In FIG. 2B, reference character 118a denotes the fast axis, and reference character 118b denotes the slow axis. The laser light emitted from the light emitting region 117 has a spread angle in the fast axis direction larger than that in the slow axis direction. Thus, a beam B20 has an elliptical shape that is long in the fast axis direction as shown in FIG. 2B.

As shown in FIG. 2C, the plurality of laser light sources 11a are installed on a base 120 so as to be aligned along the slow axis, whereby the light source array 11 is configured. Therefore, the light emitting regions 117 of the respective laser light sources 11a are disposed in one line in the slow axis direction. Here, each laser light source 11a is disposed such that the fast axis 118a of the light emitting region 117 is parallel to the direction corresponding to the short side direction of the line beam B10 shown in FIG. 1A and FIG. 1B. The plurality of laser light sources 11a forming the light source array 11 all have emission characteristics that are distributed within a certain range described in the specifications, although there are individual differences therebetween.

In FIG. 2C, the light source array 11 is configured by installing the plurality of laser light sources 11a on the base 120 such that the laser light sources 11a are adjacent to each other. However, one semiconductor light emitting element in which a plurality of light emitting regions 117 are formed so as to be aligned in the slow axis direction may be installed on the base 120. In this case, structural portions, of the semiconductor light emitting element, which emit laser light from the respective light emitting regions 117 correspond to the laser light sources 11a, respectively.

Referring back to FIG. 1A and FIG. 1B, the fast axis cylindrical lens 12 converges the laser light emitted from each laser light source 11a of the light source array 11, in the fast axis direction, and adjusts the spread of the laser light in the fast axis direction to a substantially parallel state. That is, the fast axis cylindrical lens 12 has a function of converting the laser light emitted from each laser light source 11a of the light source array 11 into parallel light only in the fast axis direction. The slow axis cylindrical lens 13 condenses the laser light emitted from each laser light source 11a of the light source array 11, in the slow axis direction.

The fast axis cylindrical lens 12 has a lens surface 12a curved only in a direction parallel to the Y-Z plane. The generatrix of the lens surface 12a is parallel to the X axis. The fast axis of each laser light incident on the fast axis cylindrical lens 12 is perpendicular to the generatrix of the lens surface 12a. Each laser light is incident on the fast axis cylindrical lens 12 so as to be aligned in the X-axis direction. Each laser light undergoes a convergence action in the fast axis direction (Z-axis direction) at the lens surface 12a to be converted into parallel light in the fast axis direction.

The slow axis cylindrical lens 13 has a lens surface 13a curved only in a direction parallel to the X-Y plane. The generatrix of the lens surface 13a is parallel to the Z axis. The generatrices of the lens surface 12a and 13a are perpendicular to each other.

The laser light emitted from each laser light source 11a is condensed in the slow axis direction by the slow axis cylindrical lens 13 and incident on a mirror 14a of the optical deflector 14. The optical deflector 14 is, for example, a MEMS (micro electro mechanical systems) mirror using a piezoelectric actuator, an electrostatic actuator, or the like. The mirror 14a has a reflectance thereof increased by a dielectric multilayer film, a metal film, or the like. The mirror 14a is disposed at a position near the focal distance on the Y-axis positive side of the slow axis cylindrical lens 13. The mirror 14a is driven so as to rotate about a rotation axis R1 parallel to the X axis. The mirror 14a has, for example, a circular shape with a diameter of about 3 mm.

A beam is formed by a collection of the laser light from the respective laser light sources 11a. The beam is condensed only in the X-axis direction by the slow-axis cylindrical lens 13, and thus the beam reflected by the mirror 14a spreads only in the X-axis direction. Thus, the line beam B10 that spreads in the X-axis direction is generated.

The line beam B10 has, for example, a spread angle in the long side direction of 10° or more as a full angle and a spread angle in the short side direction of 1° or less as a full angle. In the case where the laser radar 1 is a vehicle-mounted laser radar, the spread angle in the long side direction of the line beam B10 is preferably set to 60° or more as a full angle.

The optical deflector 14 drives the mirror 14a on the basis of a drive signal from a mirror drive circuit 33 and performs scanning in the Y-axis direction with the beam reflected from the mirror 14a. Accordingly, scanning is performed in the short side direction (Y-axis direction) with the line beam B10. In the configuration of FIG. 1A and FIG. 1B, the mirror 14a is tilted at 45° with respect to the emission optical axis of each laser light source 11a in a state where the mirror 14a is at a neutral position, but the tilt angle of the mirror 14a with respect to the emission optical axis of each laser light source 11a is not limited thereto. The tilt angle of the mirror 14a can be changed as appropriate according to the layout of the line beam scanning optical system 10.

Figure 3:
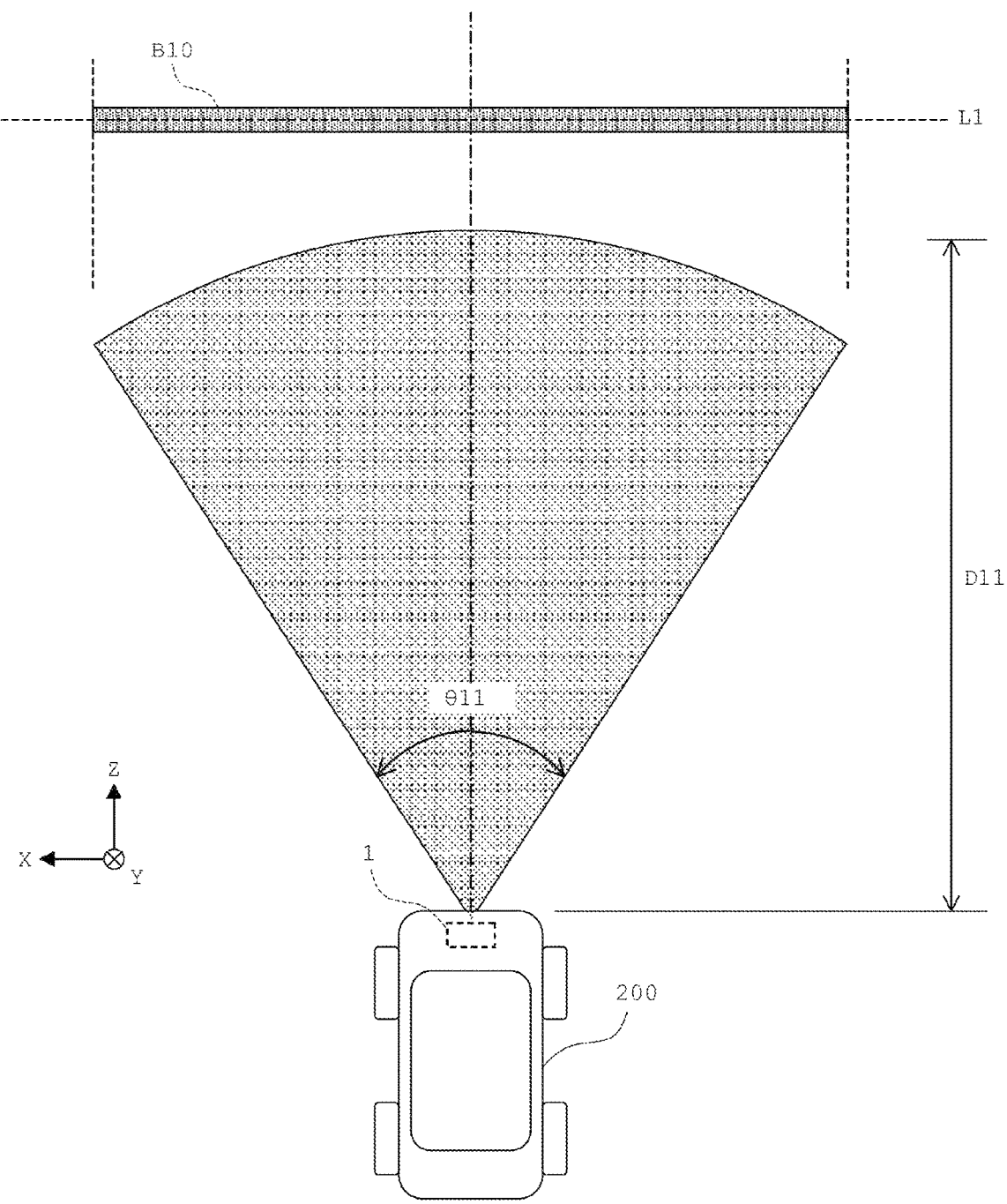
FIG. 3 is a diagram schematically showing a laser light emission state of the laser radar and a state of a line beam in a target region according to the embodiment.

FIG. 3 is a diagram schematically showing an emission state of the laser light of the laser radar 1 and a state of the line beam B10 in a target region. The upper part of FIG. 3 schematically shows a cross-sectional shape of the line beam B10 as viewed in the projection direction (Z-axis positive direction).

As shown in FIG. 3, in the present embodiment, the laser radar 1 is mounted on the front side of a vehicle 200, and the line beam B10 is projected to the front of the vehicle 200. A spread angle θ11 in the long side direction of the line beam B10 is, for example, 90°. In addition, the upper limit of a distance D11 within which object detection is possible is, for example, about 250 m. For convenience, in FIG. 3, the spread angle θ11 is represented so as to be smaller than it actually is.

Since the plurality of laser light sources 11a are disposed so as to be aligned in one direction as shown in FIG. 1A and FIG. 1B, the laser light emitted from the respective laser light sources 11a is projected so as to be aligned along a line L1 in FIG. 3. The line beam B10 is formed by combining the laser light emitted from the respective laser light sources 11a, as described above.

Referring back to FIG. 1A, the reflected light, of the line beam B10, reflected from the target region is condensed on a light receiving surface of the light receiving element 22 by the light receiving lens 21. The light receiving element 22 is, for example, an image sensor. The light receiving element 22 has, for example, a rectangular light receiving surface, and is disposed such that the long sides of the light receiving surface are parallel to the X axis. The long side direction of the light receiving surface of the light receiving element 22 corresponds to the long side direction of the line beam B10 in the target region. The reflected light of the line beam B10 is imaged on the light receiving surface of the light receiving element 22 by the light receiving lens 21 so as to extend along the long side direction of the light receiving surface.

Here, a pixel position in the X-axis direction of the light receiving surface corresponds to a position in the X-axis direction in the target region. In addition, a pixel position in the Y-axis direction of the light receiving surface corresponds to a position in the Y-axis direction in the target region. Therefore, the position of an object in the X-axis direction and the Y-axis direction in the target region can be detected on the basis of the positions of pixels at each of which a light reception signal is generated. A line sensor in which pixels are aligned in the X-axis direction may be used as the light receiving element 22. In this case, a Y position of an object to be detected is specified in synchronization with movement of a line beam.

The laser radar 1 includes a controller 31, a laser drive circuit 32, the mirror drive circuit 33, and a signal processing circuit 34 as components of the circuitry.

The controller 31 includes an arithmetic processing circuit such as a CPU (central processing unit) and a storage medium such as a ROM (read only memory) and a RAM (random access memory), and controls each part according to a preset program. The laser drive circuit 32 causes the respective laser light sources 11a of the light source array 11 to emit light in a pulsed manner in accordance with the control from the controller 31. The laser drive circuit 32 may cause the respective laser light sources 11a to simultaneously emit light in a pulsed manner, or may cause the respective laser light sources 11a to take turns in emitting light with a predetermined time difference.

The mirror drive circuit 33 drives the optical deflector 14 in accordance with the control from the controller 31. The optical deflector 14 rotates the mirror 14a about the rotation axis R1 and performs scanning with the line beam B10 in the short side direction of the line beam B10.

The signal processing circuit 34 outputs a light reception signal at each pixel of the light receiving element 22 to the controller 31. As described above, the controller 31 can detect the position of an object in the X-axis direction in the target region on the basis of the positions of pixels at each of which a light reception signal is generated. In addition, the controller 31 obtains the distance to the object existing in the target region, on the basis of the time difference between a timing when the light source array 11 is caused to emit light in a pulsed manner and a timing when the light receiving element 22 receives reflected light from the target region, that is, a timing when the light reception signal is received from the light receiving element 22.

As described above, the controller 31 detects the presence/absence of an object in the target region by causing the optical deflector 14 to perform scanning with the line beam B10 while causing the light source array 11 to emit light in a pulsed manner, and further measures the position of the object and the distance to the object. These measurement results are transmitted to a control unit on the vehicle side as needed.

Next, a method for setting the line beam scanning optical system 10 will be described.

Figure 4A:
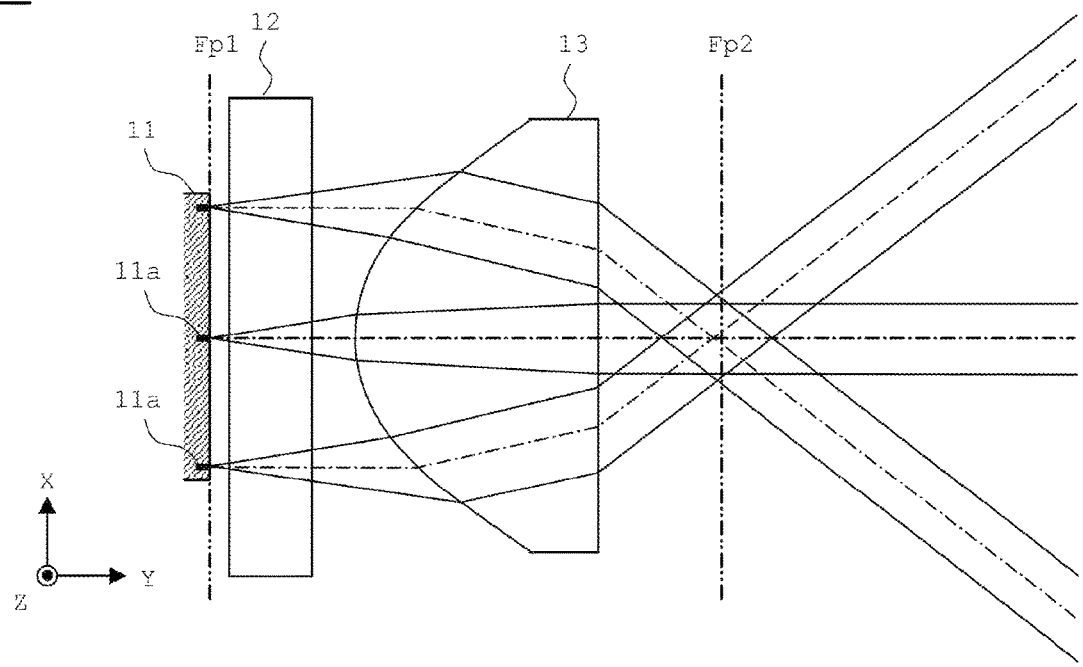
FIG. 4A is a diagram schematically showing the arrangement of laser light sources and a state of each laser light therefrom according to a comparative example.
Figure 4B:
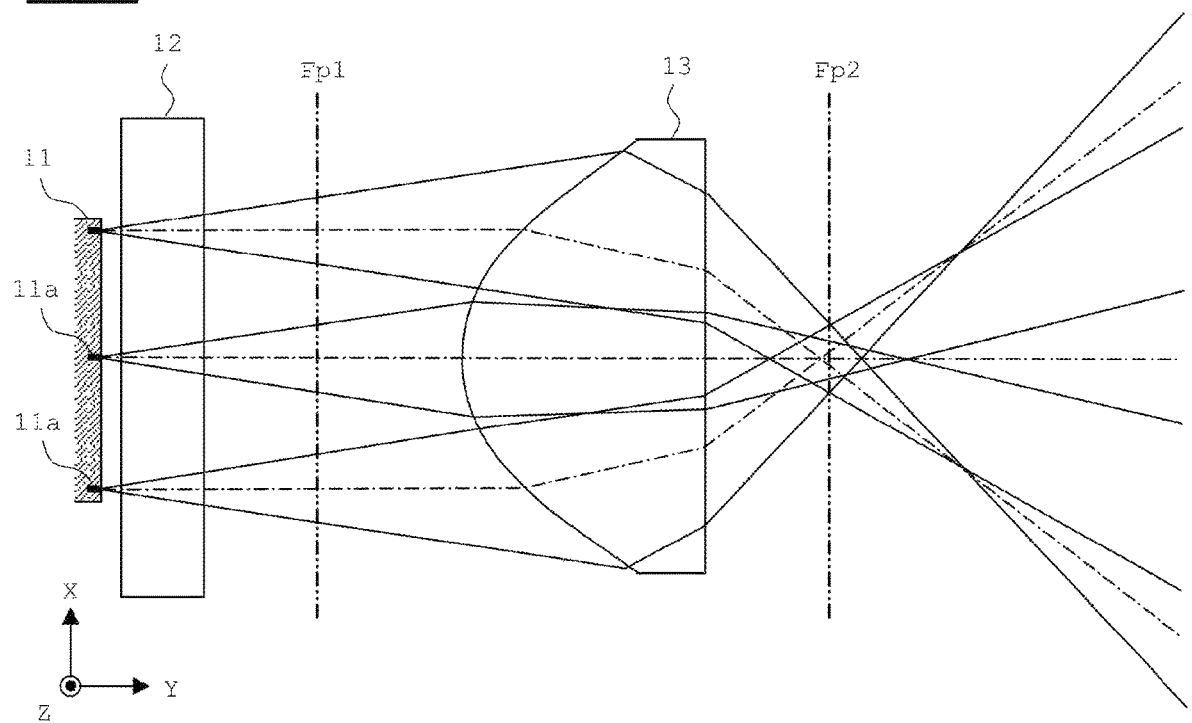
FIG. 4B is a diagram schematically showing the arrangement of laser light sources and a state of each laser light therefrom according to the embodiment.

FIG. 4A is a diagram schematically showing the arrangement of laser light sources 11a and a state of each laser light therefrom according to a comparative example. FIG. 4B is a diagram schematically showing the arrangement of the laser light sources 11a and a state of each laser light therefrom according to the embodiment.

FIG. 4A and FIG. 4B each show the laser light source 11a at the center and the laser light sources 11a at both ends. In FIG. 4A and FIG. 4B, Fp1 denotes the focal position on the laser light source 11a side (hereinafter, referred to as "front focal position") of the slow axis cylindrical lens 13, and Fp2 denotes the focal position on the optical deflector 14 side (hereinafter, referred to as "rear focal position") of the slow axis cylindrical lens 13.

As shown in FIG. 4A, in the comparative example, a light source array 11 is disposed such that the emission end face of each laser light source 11a coincides with the front focal position Fp1. In this case, the laser light emitted from the respective laser light sources 11a is condensed to the vicinity of the rear focal position Fp2 by the slow axis cylindrical lens 13, and then travels in directions in which the laser light is separated from each other. At this time, each laser light is converted into a convergent state close to parallel light, by the slow axis cylindrical lens 13. Therefore, each laser light is separated from each other, and as a result, the intensity distribution in the long side direction of the line beam B10 becomes greatly oscillated.

On the other hand, in the embodiment, as shown in FIG. 4B, the light source array 11 is disposed such that the emission end face of each laser light source 11a is shifted from the front focal position Fp1. Here, the emission end face of each laser light source 11a is disposed at a position farther from the slow axis cylindrical lens 13 than the front focal position Fp1 is. In this case as well, the laser light emitted from the respective laser light sources 11a is condensed to the vicinity of the rear focal position Fp2 by the slow axis cylindrical lens 13, and then travels in directions in which the laser light is separated from each other. However, in the embodiment, since the emission end face of the laser light source 11a is shifted from the front focal position Fp1, each laser light is converged into one focal line by the slow axis cylindrical lens 13 and then spreads so as to be parallel to the X-Y plane. Therefore, each laser light overlaps each other, and as a result, the intensity distribution in the long side direction of the line beam B10 is made uniform.

Furthermore, in the present embodiment, the slow axis cylindrical lens 13 is designed such that the angle pitch between each laser light that has passed through the slow axis cylindrical lens 13 is uniform as described below.

Figure 5A:
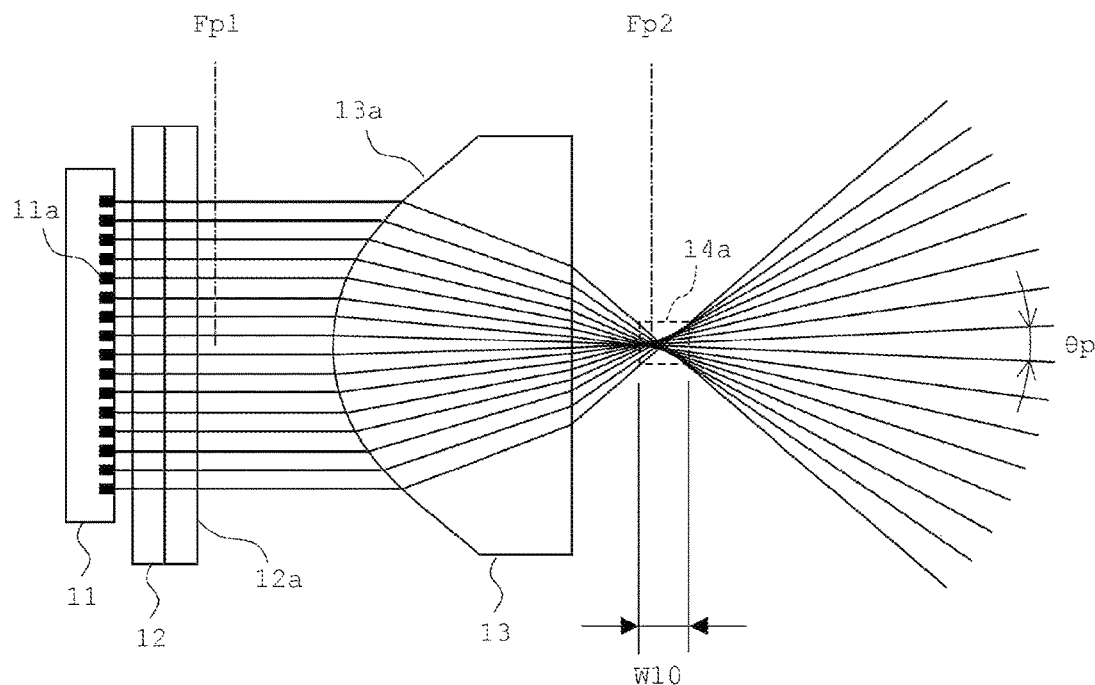
FIG. 5A is a diagram showing the action of a cylindrical lens according to the embodiment.

FIG. 5A is a diagram showing the action of the slow axis cylindrical lens 13.

In FIG. 5A, a straight line extending from each laser light source 11a shows the central axis of the laser light emitted from each laser light source 11a. In addition, Op denotes the angle pitch between each laser light emitted from the respective laser light sources 11a. The angle pitch Op is the pitch in the angle direction between the central axes of the laser light adjacent to each other. In FIG. 5A, for convenience, the central axes of the laser light reflected by the mirror 14a are bent and shown so as to be included in a plane perpendicular to the generatrix of the slow axis cylindrical lens 13.

The curvature of the lens surface 13a of the slow axis cylindrical lens 13 is adjusted such that the angle pitch Op is uniform. That is, the curvature of the lens surface 13a is not uniform but is changed in the circumferential direction. Here, the lens surface 13a is formed in the incident surface of the slow axis cylindrical lens 13, but a lens surface may be formed in the emission surface of the slow axis cylindrical lens 13, or lens surfaces may be formed in both the incident surface and the emission surface of the slow axis cylindrical lens 13. In these cases as well, the curvature of the lens surface 13a of the slow axis cylindrical lens 13 is adjusted such that the angle pitch θp is uniform.

The curvature of the lens surface 12a of the fast axis cylindrical lens 12 is adjusted such that the laser light is converted into substantially parallel light in the fast axis direction. The curvature of the lens surface 12a is not uniform but is changed in the circumferential direction.

The mirror 14a of the optical deflector 14 is disposed near the rear focal position Fp2. The position at which the mirror 14a is disposed does not necessarily coincide with the rear focal position Fp2, and it is sufficient that the mirror 14a is disposed in a range W10 where it is possible to receive a beam (a bundle of all the laser light) condensed by the slow axis cylindrical lens 13.

Furthermore, in the present embodiment, as described below, the relationship between the angle pitch θp and the spread angle of each laser light that has passed through the slow axis cylindrical lens 13 (spread angle in a direction corresponding to the alignment direction in which the laser light sources 11a of the light source array 11 are aligned) is adjusted such that the intensity distribution in the long side direction of the line beam B10 is made uniform.

Figure 5B:
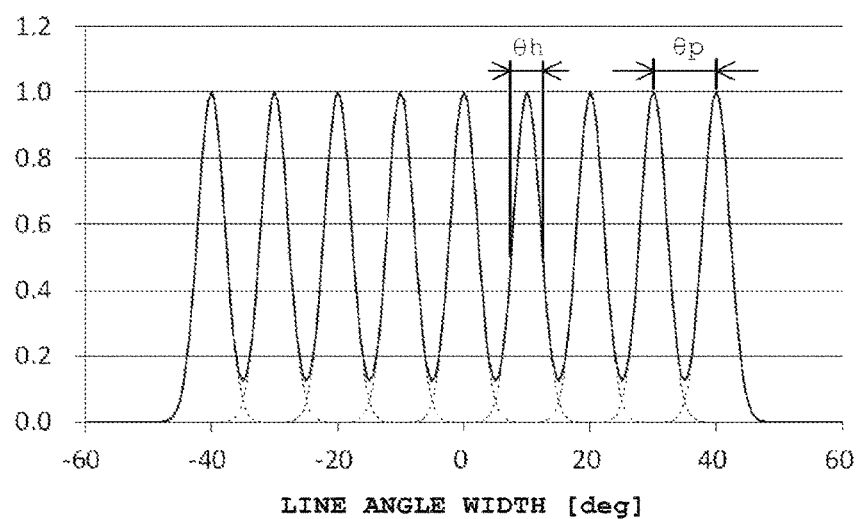
FIG. 5B is a graph showing an intensity distribution in an angle width direction of a line beam according to the embodiment when an angle pitch is set so as to be twice a full width at half maximum.

FIG. 5B is a graph (simulation result) showing an intensity distribution in an angle width direction of the line beam B10 when the angle pitch θp is set so as to be twice a spread angle θh of a range corresponding to a full width at half maximum after each laser light passes through the slow axis cylindrical lens 13.

In FIG. 5B, the horizontal axis indicates an angle in the long side direction with respect to the center position in the long side direction of the line beam B10, and the vertical axis indicates the light intensity. The vertical axis is normalized with the peak intensity (maximum value) of each laser light as 1. Here, nine laser light sources 11a are disposed in the light source array 11. The position of the central axis of the laser light emitted from the laser light source 11a at the center corresponds to the 0° position on the horizontal axis. A broken line in FIG. 5B indicates the intensity distribution of the laser light emitted from each laser light source 11a, and a solid line indicates the intensity distribution of the line beam B10 obtained by combining each laser light.

Here, the relationship between the angle pitch θp and the spread angle θh can be adjusted on the basis of the interval between the laser light sources 11a in the slow axis direction, the number of the laser light sources of the light source array, the focal distance and the aspherical shape of the slow axis cylindrical lens 13, and the distance between the front focal position Fp1 and each laser light source 11a.

As shown in FIG. 5B, when the angle pitch θp is set so as to be twice the spread angle θh of the full width at half maximum, the intensity distribution in the angle width direction of the line beam B10 becomes greatly oscillated. In this case, the minimum value of the light intensity of the line beam B10 is less than 20% of the maximum value thereof. Therefore, it can be assumed that sufficient illuminance cannot be obtained in an angle range near the minimum value and the object detection accuracy is decreased.

Figure 6A:
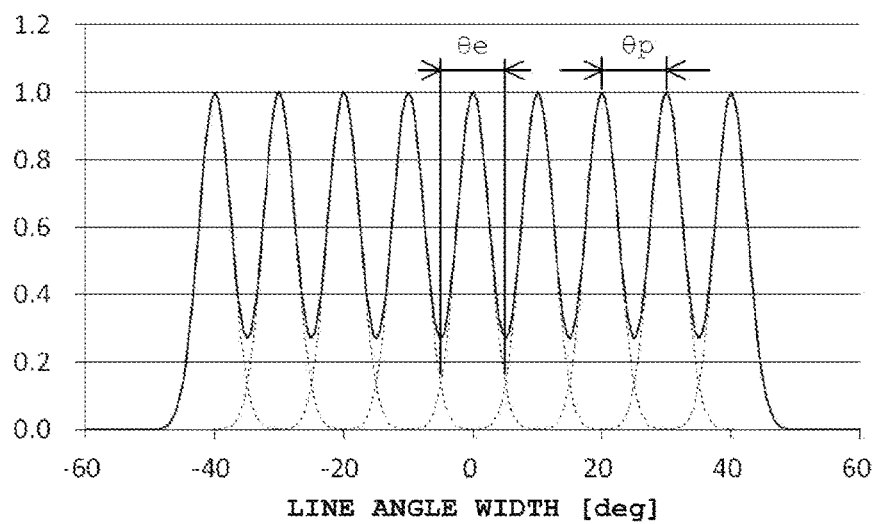
FIG. 6A is a graph showing an intensity distribution in the angle width direction of the line beam according to the embodiment when the angle pitch is set so as to be equal to a $1/e^2$ full width.

FIG. 6A is a graph (simulation result) showing an intensity distribution in the angle width direction of the line beam B10 when the angle pitch θp is set so as to be equal to a spread angle θe of a range corresponding to a 1/e² value full width of each laser light. The vertical axis and the horizontal axis in FIG. 6A are the same as those in FIG. 5B.

As shown in FIG. 6A, when the angle pitch θp is set so as to be equal to the spread angle θe of the 1/e² value full width, the amplitude of the intensity distribution in the angle width direction of the line beam B10 is smaller than that in the case of FIG. 5B. However, in this case as well, the minimum value of the light intensity of the line beam B10 is only about 30% of the maximum value thereof, and sufficient illuminance cannot be obtained in an angle range near the minimum value. Therefore, even under this condition, it can be assumed that the object detection accuracy is decreased in the angle range near the minimum value.

Figure 6B:
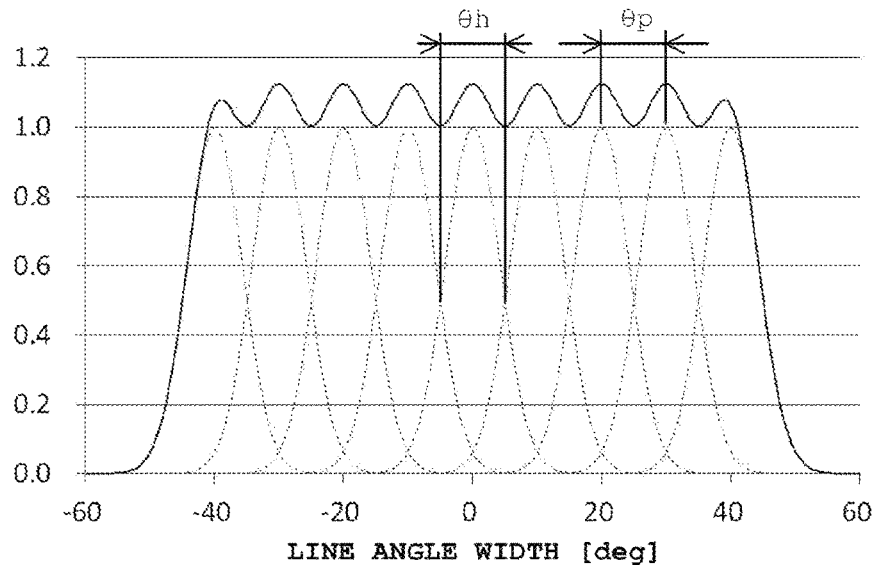
FIG. 6B is a graph showing an intensity distribution in the angle width direction of the line beam according to the embodiment when the angle pitch is set so as to be equal to the full width at half maximum.

FIG. 6B is a graph (simulation result) showing an intensity distribution in the angle width direction of the line beam B10 when the angle pitch θp is set so as to be equal to the spread angle θh of the range corresponding to the full width at half maximum of each laser light. The vertical axis and the horizontal axis in FIG. 6B are the same as those in FIG. 5B.

As shown in FIG. 6B, when the angle pitch θp is set so as to be equal to the spread angle θh of the full width at half maximum, the amplitude of the intensity distribution in the angle width direction of the line beam B10 is significantly smaller than that in the case of FIG. 5B. In addition, the minimum value of the light intensity of the line beam B10 is increased to about 90% of the maximum value of the light intensity. Furthermore, the minimum value of the light intensity of the line beam B10 is substantially equal to the peak intensity of each laser light indicated by a broken line. When the angle pitch θp is set so as to be equal to the spread angle θh of the range corresponding to the full width at half maximum of each laser light as described above, the intensity distribution of the line beam B10 can be made uniform in the angle range of −40° to +40°. Therefore, in the angle range of −45° to +45° which is slightly wider than this angle range, the object detection accuracy can be enhanced.

Figure 6C:
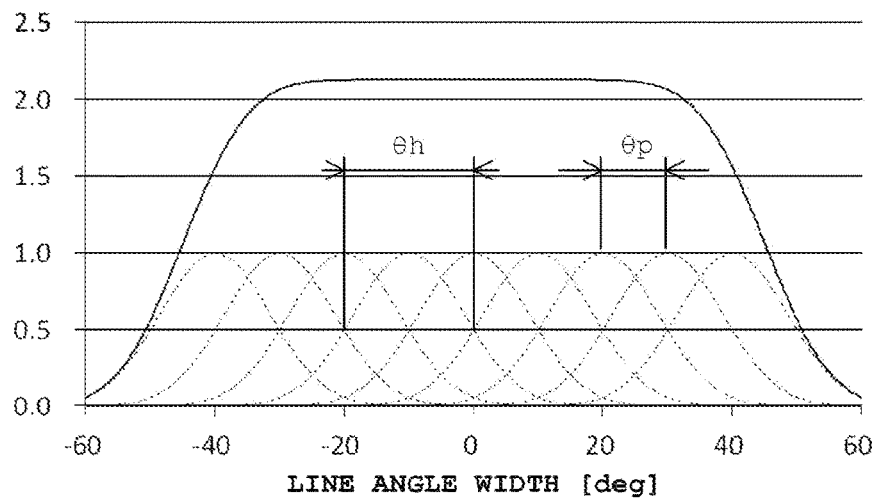
FIG. 6C is a graph showing an intensity distribution in the angle width direction of the line beam according to the embodiment when the angle pitch is set so as to be twice the $1/e^2$ full width.

FIG. 6C is a graph (simulation result) showing an intensity distribution in the angle width direction of the line beam B10 when the angle pitch θp is set so as to be ½ of the spread angle θh of the range corresponding to the full width at half maximum of each laser light. The vertical axis and the horizontal axis in FIG. 6C are the same as those in FIG. 5B.

As shown in FIG. 6C, when the angle pitch θp is set so as to be ½ of the spread angle θh of the full width at half maximum, the intensity distribution in the angle width direction of the line beam B10 is made flat in the angle range of −30° to +30°. In addition, in the angle range of −45° to +45°, the light intensity exceeds the peak intensity of each laser light. Therefore, the object detection accuracy can be enhanced in the angle range of −45° to +45°, and furthermore, an object can be detected more accurately in the angle range of −30° to +30°.

From the above verification, it is found that the intensity distribution in the long side direction of the line beam B10 can be made uniform by setting the angle pitch θp so as to be equal to or less than the spread angle θh of the range corresponding to the full width at half maximum of each laser light. Therefore, the position at which each laser light source 11a is disposed may be set in consideration of the interval in the slow axis direction between the laser light source 11a and the focal distance of the slow axis cylindrical lens 13 such that the angle pitch θp is equal to or less than the spread angle θh of the range corresponding to the full width at half maximum of each laser light.

As can be seen with reference to FIG. 6B and FIG. 6C, the angle width in the long side direction of the line beam B10 becomes wider as the angle pitch θp is made smaller with respect to the full width at half maximum of each laser light. That is, whereas the angle width in the long side direction of the line beam B10 is about ±50° in FIG. 6B, the angle width in the long side direction of the line beam B10 is widened to about ±60° in FIG. 6C. Therefore, the magnitude of the angle pitch θp with respect to the spread angle θh of the full width at half maximum is preferably adjusted according to the angle width of the effective detection range of the line beam B10. For example, when the angle width of the effective detection range of the line beam B10 is set to about ±45°, the angle pitch θp may be set so as to be substantially equal to the spread angle θh of the range corresponding to the full width at half maximum of each laser light as shown in FIG. 6B.

Moreover, the farther the laser light sources 11a are from the slow axis cylindrical lens 13, the wider the width in the slow axis direction of each laser light when it is incident on the slow axis cylindrical lens 13. Thus, the laser light emitted from the laser light sources 11a at both ends is more likely to reach the edge of the slow axis cylindrical lens 13 and is less likely to be taken into the slow axis cylindrical lens 13. Therefore, when the laser light sources 11a are made farther from the slow axis cylindrical lens 13, it can be said that, preferably, the positions at which the laser light sources 11a are disposed are set, or the overall width of the light emitting region of the light source array 11 is optimized, in a range where the utilization efficiency of the laser light is not decreased.

In the above simulation, it is assumed that the far-field image of the light emitted from the individual laser light sources is an ideal Gaussian distribution, but the actual intensity distribution more or less deviates from the Gaussian distribution, so that it is necessary to correct the angle pitch in accordance with the actual intensity distribution.

Effects of Embodiment

According to the present embodiment, the following effects are achieved.

Since the plurality of laser light sources 11a are used, the amount of the laser light applied to the target region can be increased. In addition, since the plurality of laser light sources 11a are disposed at positions shifted from the focal position on the laser light source 11a side (front focal position Fp1) of the slow axis cylindrical lens 13 (second cylindrical lens), each laser light that has passed through the slow axis cylindrical lens 13 (second cylindrical lens) spreads in the alignment direction in which the laser light sources 11a are aligned, and overlaps each other. Accordingly, the intensity distribution in the long side direction of the line beam B10 can be made uniform. Therefore, an object can be detected at a longer distance and a wider angle, and an object can be stably detected at all positions on the line beam B10.

As described with reference to FIG. 5A, the slow axis cylindrical lens 13 (second cylindrical lens) is configured such that the angle pitch θp between each laser light that has passed through the slow axis cylindrical lens 13 (second cylindrical lens) is made uniform. Accordingly, the intensity distribution in the angle width direction of the line beam B10 can be smoothly made uniform.

The plurality of laser light sources 11a are disposed at positions at which the angle pitch θp is equal to or less than the spread angle θh of the range corresponding to the full width at half maximum after the laser light emitted from each laser light source 11a passes through the slow axis cylindrical lens 13. Accordingly, as described with reference to FIG. 5B to FIG. 6C, the intensity distribution in the angle width direction of the line beam B10 can be made uniform, and an object can be accurately detected in the entire detection target angle range (effective detection range).

As shown in FIG. 4B and FIG. 5A, the plurality of laser light sources 11a are disposed at positions farther from the slow axis cylindrical lens 13 (second cylindrical lens) than the front focal position Fp1 is. Accordingly, the gap between the laser light sources 11a and the slow axis cylindrical lens 13 can be widened, and the fast axis cylindrical lens 12 can be smoothly disposed between the laser light sources 11a and the slow axis cylindrical lens 13. In addition, the light, from the individual laser light sources, which has passed through the slow axis cylindrical lens 13 can be converted into converged light, thereby reducing the condensing spot of the beam composed of this laser light group. Accordingly, the size of the mirror 14a of the optical deflector 14 can be made smaller.

As shown in FIG. 2A and FIG. 2C, the respective laser light sources 11a are end face-emitting semiconductor lasers and are disposed so as to be aligned in the slow axis direction. Accordingly, the fast axis direction in which the beam quality is high can be set to the short side direction of the line beam B10, the line beam B10 can be made closer to the parallel light in the short side direction, and as a result, a line beam with a higher aspect ratio can be formed.

As shown in FIG. 5A, the mirror 14a is disposed near the rear focal position Fp2 of the slow axis cylindrical lens 13 (second cylindrical lens). Accordingly, the beam narrowed by the slow axis cylindrical lens 13 can be efficiently received by the mirror 14a, so that the size of the mirror 14a can be made very small. Thus, the mirror 14a can be driven responsively and stably, and scanning can be smoothly performed with the line beam B10.

In the present embodiment, the optical system for generating the line beam B10 is disposed only on the laser light source 11a side with respect to the optical deflector 14. Accordingly, the line beam B10 can be generated easily and smoothly. That is, when an optical component for generating the line beam B10 is also disposed at a position away from the laser light source 11a with respect to the optical deflector 14 (on the subsequent stage side of the optical deflector 14), the incident state of a beam on this optical component is changed in accordance with drive of the optical deflector 14. Therefore, in this configuration, it is necessary to precisely design the optical component in consideration of the change in the incident state of the beam. On the other hand, in the present embodiment, since the optical system for generating the line beam B10 is disposed only on the laser light source 11a side (previous stage side) with respect to the optical deflector 14, the components forming this optical system can be easily designed. In addition, since only the two cylindrical lenses (the fast axis cylindrical lens 12, the slow axis cylindrical lens 13) disposed such that the generatrices thereof are orthogonal to each other are used as this optical system, the configuration can be simplified and the number of parts can be reduced.

Moreover, in the present embodiment, since the fast axis cylindrical lens 12 is disposed immediately after the laser light source 11a, the width in the fast axis direction of each laser light can be reduced. Accordingly, the size of the mirror 14a can be made smaller, and the width in the short side direction of the line beam B10 can be made smaller.

Although the embodiment of the present invention has been described above, the present invention is not limited to the above embodiment, and various other modifications may be made.

<Modification 1>

For example, in the above embodiment, as shown in FIG. 2A to FIG. 2C, each laser light source 11a has one light emitting region 117. However, each laser light source 11a may have a plurality of light emitting regions 117 in the fast axis direction.

Figure 7A:
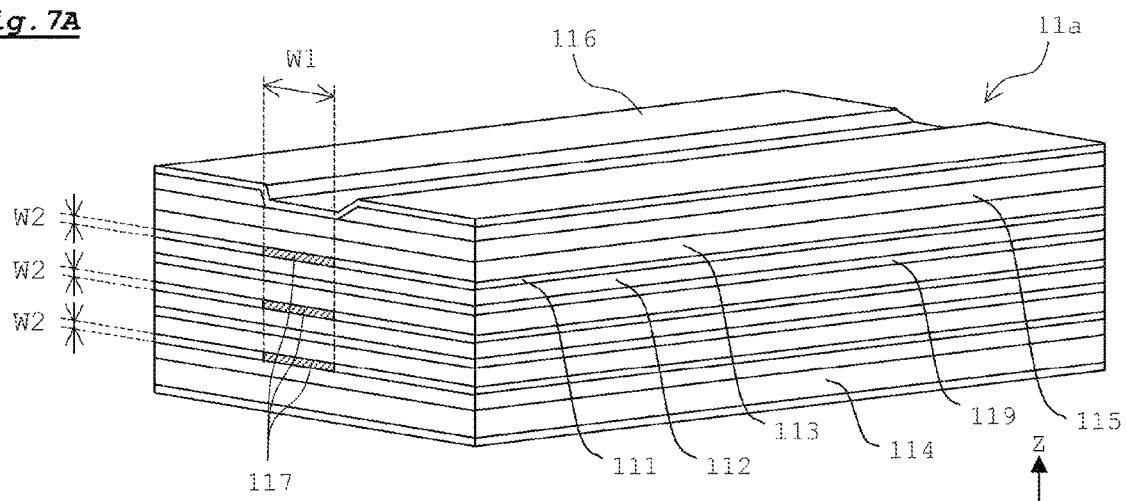
FIG. 7A and FIG. 7B are each a perspective view showing a configuration of a laser light source according to Modification 1.
Figure 7B:
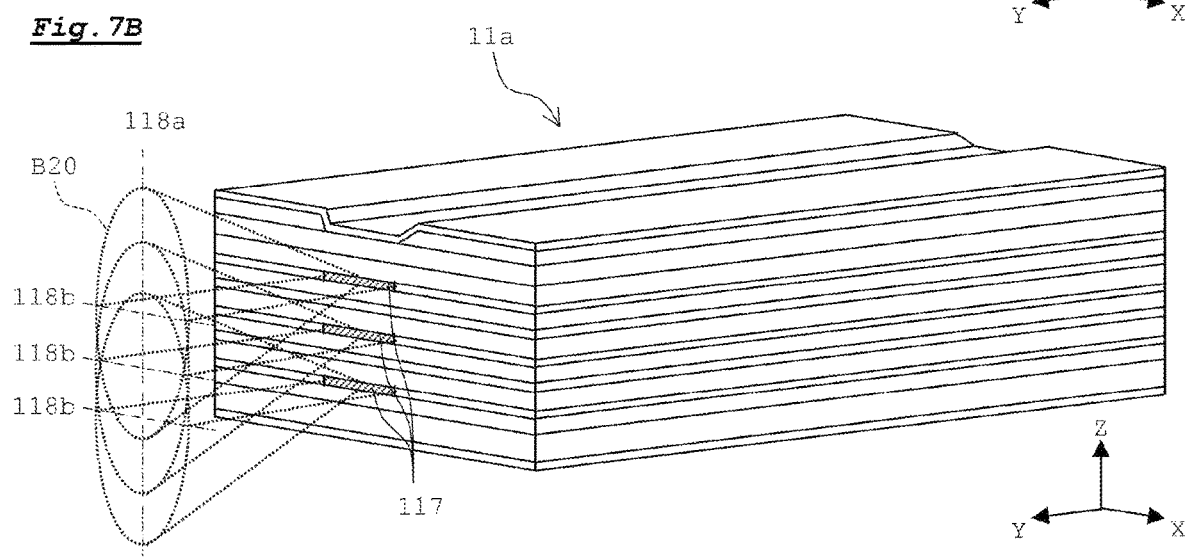
Figure 7C:
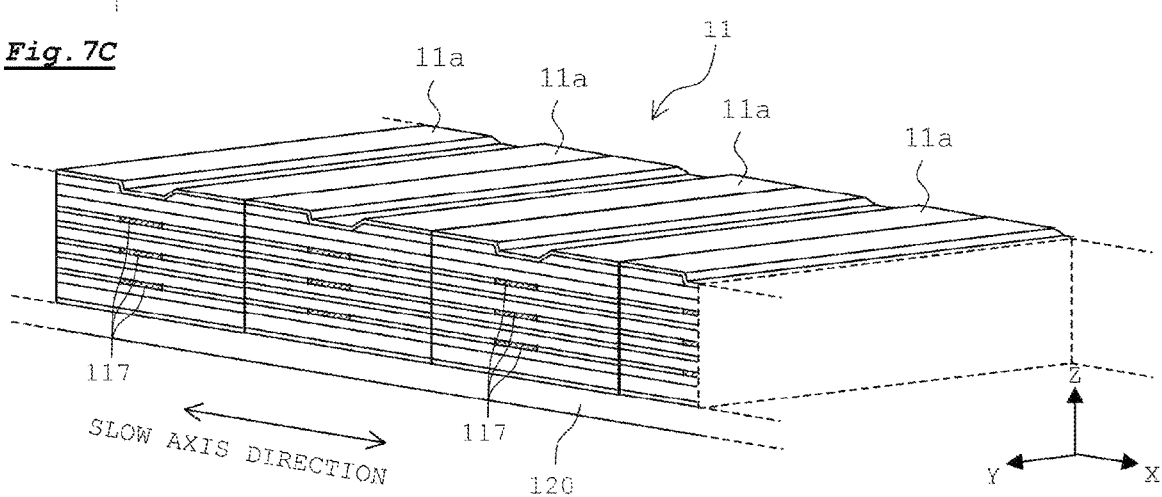
FIG. 7C is a perspective view showing a configuration of a light source array of a laser radar according to Modification 1.

FIG. 7A to FIG. 7C are diagrams showing a configuration example in this case.

In this configuration example, as shown in FIG. 7A, a plurality of light emitting regions 117 are formed in one laser light source 11a so as to be aligned in the fast axis direction (Z-axis direction). Sets of the active layer 111, the N-type clad layer 112, and the P-type clad layer 113 are laminated between the N-type substrate 114 and the contact layer 115 with tunnel junction layers 119 interposed between the sets. Accordingly, three light emitting regions 117 are formed.

Similar to the case of FIG. 2A, in each light emitting region 117, the width W1 in the direction parallel to the active layer 111 is larger than the width W2 in the direction perpendicular to the active layer 111. By applying a drive current to the electrode 116, laser light is emitted from each of the three light emitting regions 117 as shown in FIG. 7B. The beam B20 has a spread angle in a direction parallel to the fast axis 118a larger than that in a direction parallel to the slow axis 118b. Thus, the beam B20 has an elliptical shape that is long in the fast axis direction.

In this configuration example, the light source array 11 is configured such that a plurality of laser light sources 11a are disposed so as to be aligned in the slow axis direction as shown in FIG. 7C. Accordingly, a plurality of light emitting regions 117 are disposed so as to be aligned not only in the slow axis direction but also in the fast axis direction. In this case as well, one semiconductor light emitting element in which a plurality of light emitting regions 117 are formed so as to be aligned in the slow axis direction and the fast axis direction may be installed on the base 120.

Figure 8A:
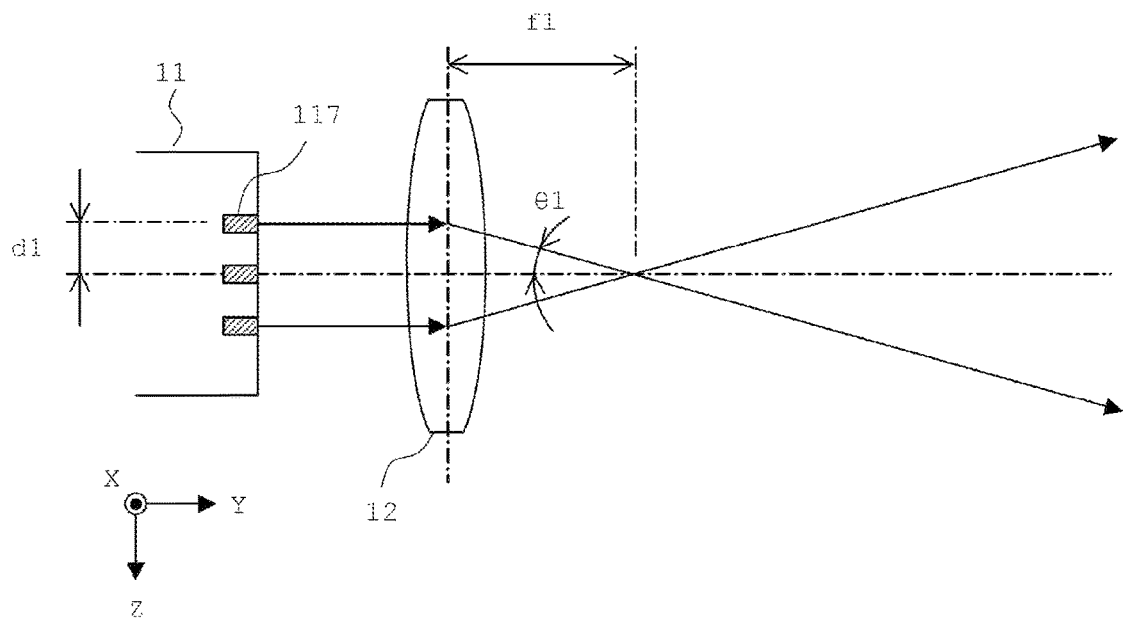
FIG. 8A is a diagram schematically showing a travelling direction of laser light emitted from each of three laser light sources aligned vertically according to Modification 1.

In this configuration example, since the number of light emitting regions 117 is increased as compared to that in the configuration of FIG. 2C, the light quantity of the line beam B10 can be increased. However, in this configuration, as shown in FIG. 8A, the positions of the upper and lower light emitting regions 117 are displaced with respect to the optical axis of the fast axis cylindrical lens 12, so that the central axes of the laser light emitted from these light emitting regions 117 are tilted by the fast axis cylindrical lens 12.

Here, when the displacement amount of each light emitting region 117 with respect to the optical axis of the fast axis cylindrical lens 12 is denoted by d1, and the focal distance of the fast axis cylindrical lens 12 is denoted by f1, a tilt angle θ1 of the central axis of the laser light emitted from the light emitting region 117 can be defined by the following equation.

$$\theta 1 = \tan^{-1}(d1/f1) \quad (1)$$

As described above, the laser light emitted from the upper and lower light emitting regions 117 travels in directions tilted in the fast axis direction with respect to the laser light emitted from the central light emitting region 117, so that the line beam B10 spreads in the short side direction thereof as compared to that in the above embodiment. Here, in order to suppress the spread of the line beam B10 in the short side direction, the intervals (displacement amounts d1) between the light emitting regions 117 aligned in the fast axis direction are preferably decreased as much as possible on the basis of the above equation (1). The intervals between the light emitting regions 117 aligned in the fast axis direction are preferably at least smaller than the intervals between the laser light sources 11a. In addition, the focal distance of the fast axis cylindrical lens 12 is preferably as long as possible. Accordingly, the tilt angle θ1 can be reduced, and the spread of the line beam B10 in the short side direction can be suppressed.

When the laser light emitted from each light emitting region of the light source array 11 in which the light emitting regions are aligned in the fast axis direction as described above is converted into parallel light in the fast axis direction by the fast axis cylindrical lens 12, line beams whose number corresponds to the number of the light emitting regions aligned along the fast axis are formed. In this case, it is possible to detect a plurality of lines at the same time. In the case where a problem arises in terms of system processing unless the number of lines is one, the spread angles in the short side direction of the lines are sacrificed, but, by disposing each light source array 11 at a position slightly shifted from the focal position of the fast axis cylindrical lens 12, it is also possible to widen the divergence angles of the line beams to cause the respective line beams to overlap each other, thereby forming one line beam.

Figure 8B:
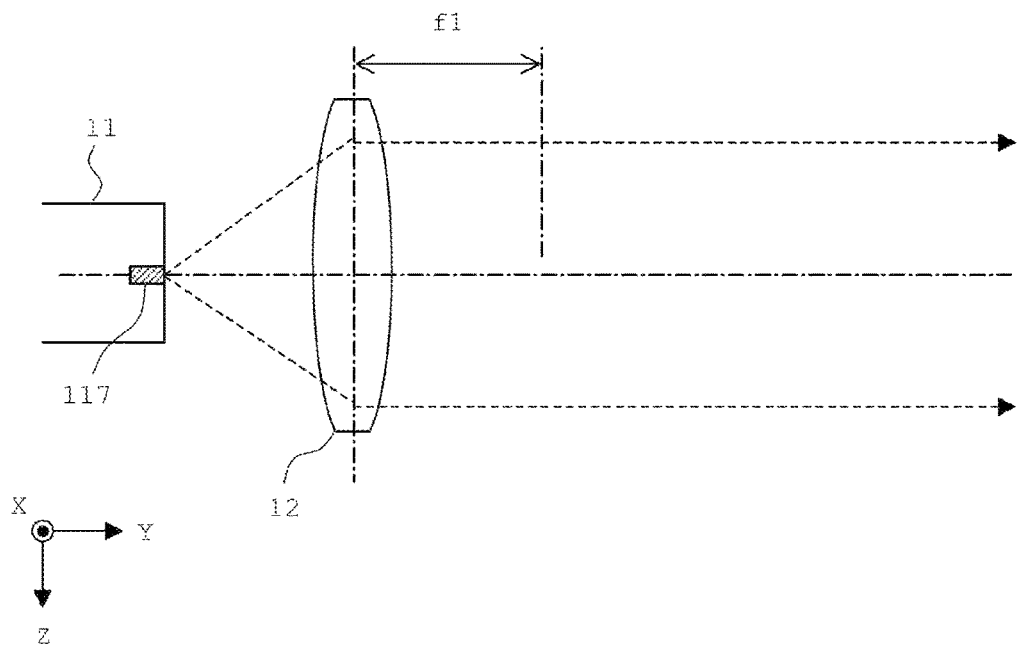
FIG. 8B is a diagram schematically showing spread in a fast axis direction of the laser light emitted from the laser light source according to the embodiment.

In the above embodiment, the plurality of laser light sources 11a are disposed only in one line, and thus, as shown in FIG. 8B, the laser light emitted from the light emitting regions 117 can be converted into substantially parallel light in the fast axis direction by the fast axis cylindrical lens 12. Therefore, the spread of the line beam B10 in the short side direction can be suppressed, and an object at a more distant place can be efficiently detected.

<Modification 2>

Figure 9A:
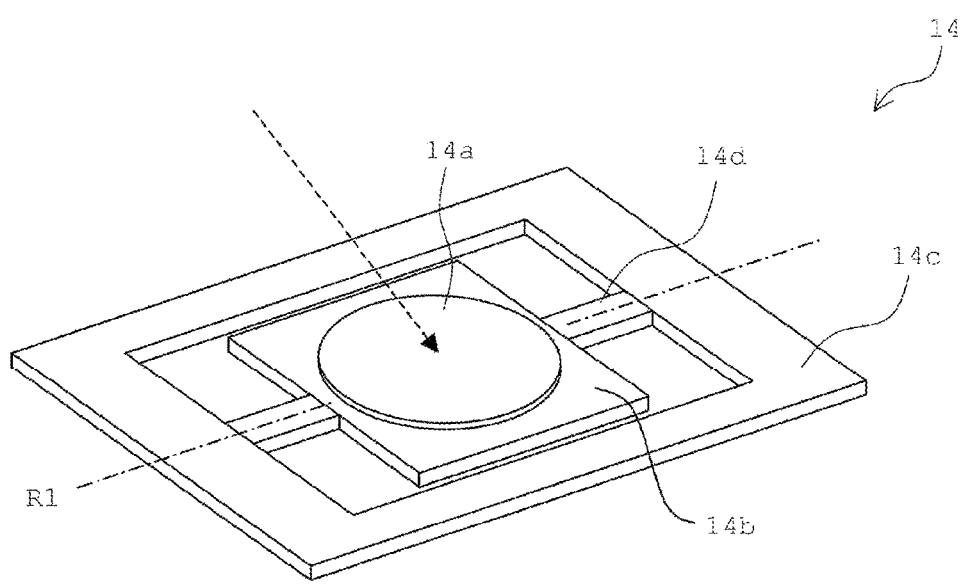
FIG. 9A is a perspective view showing a configuration of an optical deflector according to the embodiment.

In the above embodiment, as shown in FIG. 9A, a circular mirror can be used as the mirror 14a disposed in the optical deflector 14. Here, the optical deflector 14 is composed of a MEMS mirror. In this case, the optical deflector 14 includes a support portion 14b having a square shape in a plan view, a frame portion 14c surrounding the support portion 14b, and beam portions 14d connecting the support portion 14b and the frame portion 14c at the intermediate positions of opposite sides of the support portion 14b. The mirror 14a is installed on the upper surface of the support portion 14b. The support portion 14b is rotated about the two beam portions 14d by a drive unit that is not shown. An axis connecting the two beam portions 14d is a rotation axis R1 of the support portion 14b and the mirror 14a. A beam is incident on the mirror 14a in the direction of a broken line arrow.

Figure 9B:
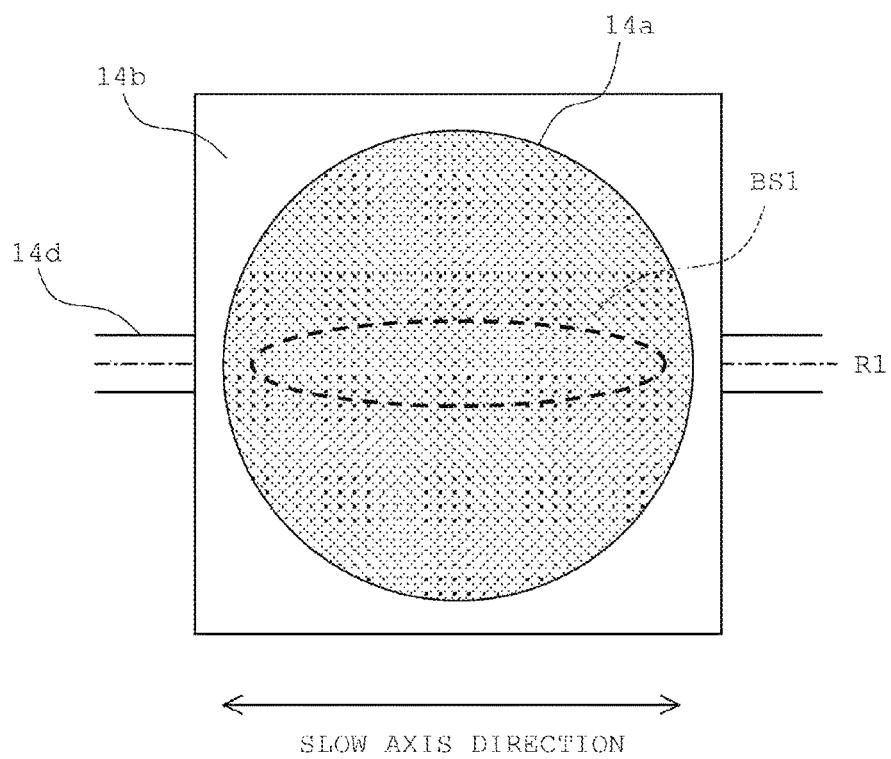
FIG. 9B is a diagram schematically showing a relationship between a beam incident on a mirror according to the embodiment and the mirror.

FIG. 9B is a plan view of the vicinity of the mirror 14a. As described above, the laser light sources 11a are aligned in the slow axis direction, and the light emitted from the laser light sources 11a is converted into parallel light by the fast axis cylindrical lens 12 disposed close to the laser light source 11a, so that the shape of a beam spot BS1 of the beam incident on the mirror 14a is long in the slow axis direction as shown in FIG. 9B. Therefore, in the case where the shape of the mirror 14a is a circle, a wide extra region where the beam is not incident occurs in the mirror 14a.

Figure 10A:
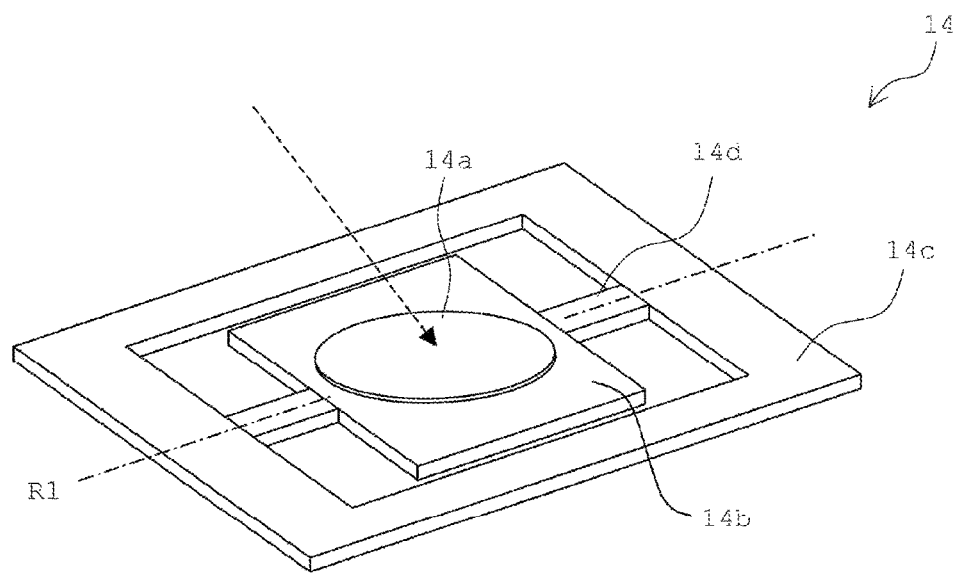
FIG. 10A is a perspective view showing a configuration of an optical deflector according to Modification 2.
Figure 10B:
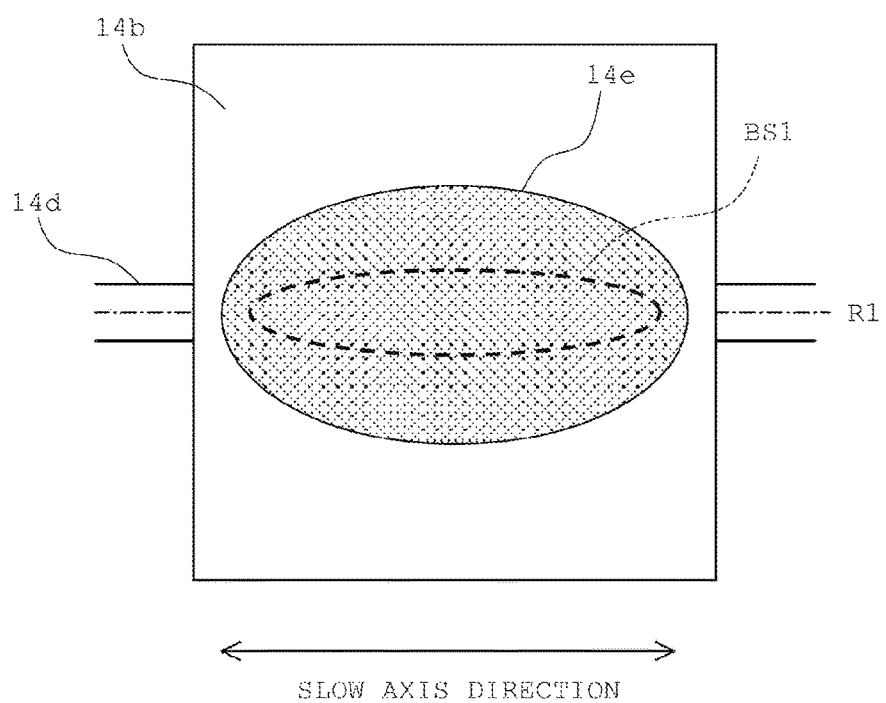
FIG. 10B is a diagram schematically showing a relationship between a beam incident on a mirror according to Modification 2 and the mirror.

On the other hand, in Modification 2, as shown in FIG. 10A and FIG. 10B, a mirror 14e having a long shape in one direction is installed in the optical deflector 14. That is, the elliptical mirror 14e is installed on the support portion 14b such that the longitudinal direction thereof is parallel to a direction corresponding to the slow axis direction (alignment direction in which the laser light sources 11a are aligned). Accordingly, the extra region of the mirror 14e where a beam is not incident is reduced as compared to that of the circular mirror 14a shown in FIG. 9A, and the weight of the mirror 14e can be reduced. As a result, when the mirror 14e is driven at a constant angle, the stress generated in the support portion 14b of the mirror 14e can be reduced, and a larger deflection angle can be realized, or a highly robust MEMS mirror can be realized. In addition, the dynamic deflection (distortion or deformation of the mirror 14e) generated when the mirror 14e is driven can be reduced. Therefore, scanning can be more stably performed with the line beam B10.

The shape of the mirror 14e does not necessarily have to be an ellipse, and may be any shape as long as the shape is long in one direction. For example, the shape of the mirror 14e may be an oval, a track shape, a rectangle, or the like. In the above embodiment as well, the shape of the mirror 14a is not limited to a circular shape, and may be another shape such as a square.

<Modification 3>

Figure 11:
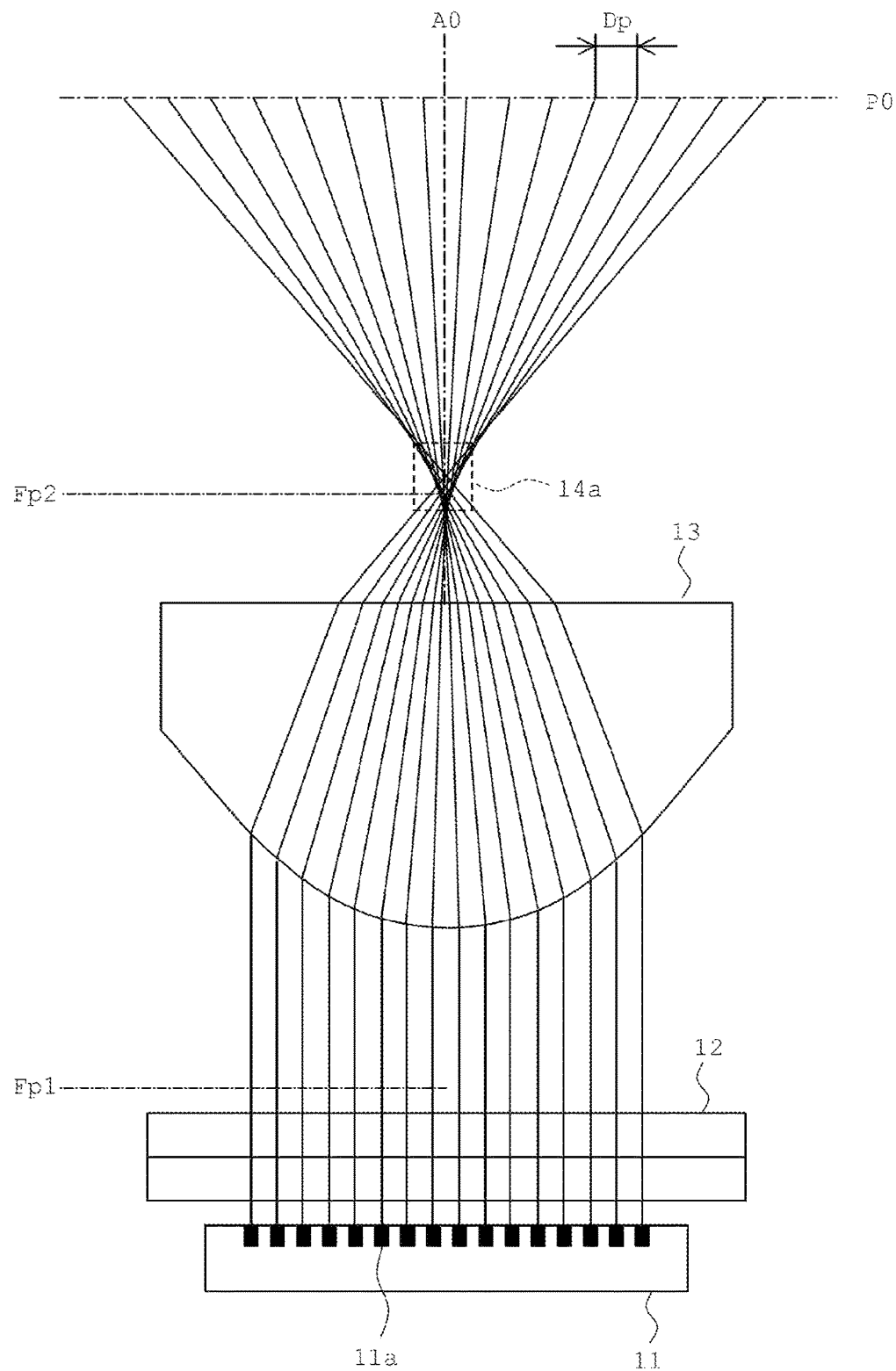
FIG. 11 is a diagram showing the action of a cylindrical lens according to Modification 3.

In the above embodiment, the lens surface 13a of the slow axis cylindrical lens 13 is formed such that the angle pitch θp of the line beam B10 is uniform. However, as shown in FIG. 11, the slow axis cylindrical lens 13 may be configured such that a width pitch Dp between each laser light in a projective plane P0 is uniform. The projective plane P0 is a plane perpendicular to an axis A0 (optical axis of the slow axis cylindrical lens 13) passing through the center of the line beam B10.

In this configuration, similar to the verification of FIG. 5B to FIG. 6C, the plurality of laser light sources 11a may be disposed at positions at which the width pitch Dp is equal to or less than the full width at half maximum of the laser light emitted from each laser light source 11a. Accordingly, the intensity distribution in the long side direction of the line beam B10 can be made uniform, and an object in the projective plane P0 can be accurately detected.

<Other Modifications>

In the above embodiment, an end face-emitting laser diode is used as each laser light source 11a. However, a light source array 11 in which surface-emitting laser light sources such as VCSEL (vertical cavity surface emitting lasers) are aligned in a straight line or arranged in a matrix may be used.

In the above embodiment, each laser light source 11a is disposed at a position away from the slow axis cylindrical lens 13 with respect to the front focal position Fp1. However, each laser light source 11a may be disposed at a position closer to the slow axis cylindrical lens 13 with respect to the front focal position Fp1. In this case as well, the position of each laser light source 11a may be adjusted such that the intensity distribution of the line beam B10 is made uniform as in FIG. 6B and FIG. 6C.

In the above embodiment, as shown in FIG. 3, scanning is performed in the vertical direction with the line beam B10 which is long in the horizontal direction. However, scanning may be performed in the horizontal direction with a line beam which is long in the vertical direction. In this configuration, the spread angle in the long side direction of the line beam B10 can be small, but the swing angle in the horizontal direction of the line beam B10 becomes larger.

In the above embodiment, a MEMS mirror is used as the optical deflector 14. However, another optical deflector such as a magnetically movable mirror or a galvano mirror may be used as the optical deflector 14.

In the above embodiment, the line beam scanning optical system 10 is configured such that the light source array 11, the fast axis cylindrical lens 12, the slow axis cylindrical lens 13, and the optical deflector 14 are aligned in one direction. However, the layout of the line beam scanning optical system 10 is not limited thereto. For example, the line beam scanning optical system 10 may be configured such that an optical path is bent by disposing a mirror in the middle of the optical path. In addition, a first cylindrical lens may be disposed on the subsequent stage side of the second cylindrical lens.

The number of the laser light sources 11a disposed in the light source array 11 is not limited to the number illustrated in the above embodiment. In addition, the plurality of laser light sources 11a do not necessarily have to be unitized, and a plurality of laser light sources may be individually disposed.

In the above embodiment, the laser radar 1 is mounted on the vehicle 200. However, the laser radar 1 may be mounted on another moving body. In addition, the laser radar 1 may be mounted on equipment or a facility other than the moving body. Moreover, the laser radar 1 may have only an object detection function.

The first cylindrical lens and the second cylindrical lens may be integrated and configured as a toroidal lens having different aspherical surfaces along the slow axis and the fast axis, respectively.

In addition to the above, various modifications can be made as appropriate to the embodiments of the present invention, without departing from the scope of the technological idea defined by the claims.

What is claimed is:

1. A line beam scanning optical system for generating a line beam that is long in one direction and performing scanning with the line beam in a short side direction of the line beam, the line beam scanning optical system comprising:
a plurality of laser light sources disposed so as to be aligned in a direction corresponding to a long side of the line beam;
an optical deflector configured to displace a mirror on which laser light emitted from the plurality of laser light sources is incident, and to deflect the line beam in the short side direction;
a first cylindrical lens configured to converge the laser light emitted from the plurality of laser light sources, into substantially parallel light in a direction perpendicular to an alignment direction in which the laser light sources are aligned, and to cause the laser light to be incident on the mirror; and
a second cylindrical lens configured to condense the laser light emitted from the plurality of laser light sources, in the alignment direction in which the laser light sources are aligned, and to cause the laser light to be incident on the mirror, wherein:
the plurality of laser light sources are disposed at positions shifted from a focal position on the laser light source side of the second cylindrical lens in a direction toward or away from the second cylindrical lens, and
the second cylindrical lens converges the laser light emitted from each of the laser light sources into one focal line.

2. The line beam scanning optical system according to claim 1, wherein the second cylindrical lens causes an angle pitch between each laser light that has passed through the second cylindrical lens to be uniform.

3. The line beam scanning optical system according to claim 2, wherein the plurality of laser light sources are disposed at positions at which the angle pitch is equal to or less than an angle of a range corresponding to a full width at half maximum after the laser light emitted from each of the laser light sources passes through the second cylindrical lens.

4. The line beam scanning optical system according to claim 1, wherein the second cylindrical lens causes a width pitch in a projective plane between each laser light that has passed through the second cylindrical lens to be uniform.

5. The line beam scanning optical system according to claim 4, wherein the plurality of laser light sources are disposed at positions at which the width pitch is equal to or less than a full width at half maximum after the laser light emitted from each of the laser light sources passes through the second cylindrical lens.

6. The line beam scanning optical system according to claim 1, wherein the plurality of laser light sources are disposed at positions farther from the second cylindrical lens than the focal position is.

7. The line beam scanning optical system according to claim 1, wherein the laser light sources are end face-emitting semiconductor lasers and are disposed so as to be aligned in a slow axis direction.

8. The line beam scanning optical system according to claim 1, wherein the mirror is disposed near the focal position of the second cylindrical lens.

9. The line beam scanning optical system according to claim 1, wherein each of the laser light sources includes a plurality of light emitting regions in a direction perpendicular to the alignment direction, and an interval between the light emitting regions is smaller than an interval between the laser light sources.

10. The line beam scanning optical system according to claim 1, wherein the mirror has a long shape in one direction and is disposed such that a longitudinal direction of the shape is parallel to a direction corresponding to the alignment direction.

11. A laser radar comprising:
a line beam scanning optical system configured to generate a line beam that is long in one direction and to perform scanning with the line beam in a short side direction of the line beam; and
a light receiving optical system configured to receive reflected light, from an object, of laser light projected from the line beam scanning optical system, wherein:
the line beam scanning optical system includes
a plurality of laser light sources disposed so as to be aligned in a direction corresponding to a long side of the line beam,
an optical deflector configured to displace a mirror on which laser light emitted from the plurality of laser light sources is incident, and to deflect the line beam in the short side direction,
a first cylindrical lens configured to converge the laser light emitted from the plurality of laser light sources, into substantially parallel light in a direction perpendicular to an alignment direction in which the laser light sources are aligned, and to cause the laser light to be incident on the mirror, and
a second cylindrical lens configured to condense the laser light emitted from the plurality of laser light sources, in the alignment direction in which the laser light sources are aligned, and to cause the laser light to be incident on the mirror,
the second cylindrical lens converges the laser light emitted from each of the laser light sources into one focal line, and
the plurality of laser light sources are disposed at positions shifted from a focal position on the laser light source side of the second cylindrical lens in a direction toward or away from the second cylindrical lens.

12. The laser radar according to claim 11, wherein the second cylindrical lens causes an angle pitch between each laser light that has passed through the second cylindrical lens to be uniform.

13. The laser radar according to claim 12, wherein the plurality of laser light sources are disposed at positions at which the angle pitch is equal to or less than an angle of a range corresponding to a full width at half maximum after the laser light emitted from each of the laser light sources passes through the second cylindrical lens.

14. The laser radar according to claim 11, wherein the second cylindrical lens causes a width pitch in a projective plane between each laser light that has passed through the second cylindrical lens to be uniform.

15. The laser radar according to claim 14, wherein the plurality of laser light sources are disposed at positions at which the width pitch is equal to or less than a full width at half maximum after the laser light emitted from each of the laser light sources passes through the second cylindrical lens.

16. The laser radar according to claim 11, wherein the plurality of laser light sources are disposed at positions farther from the second cylindrical lens than the focal position is.

17. The laser radar according to claim 11, wherein the laser light sources are end face-emitting semiconductor lasers and are disposed so as to be aligned in a slow axis direction.

18. The laser radar according to claim 11, wherein the mirror is disposed near the focal position of the second cylindrical lens.

19. The laser radar according to claim 11, wherein each of the laser light sources includes a plurality of light emitting regions in a direction perpendicular to the alignment direction, and an interval between the light emitting regions is smaller than an interval between the laser light sources.

20. The laser radar according to claim 11, wherein the mirror has a long shape in one direction and is disposed such that a longitudinal direction of the shape is parallel to a direction corresponding to the alignment direction.

21. A line beam scanning optical system for generating a line beam that is long in one direction and performing scanning with the line beam in a short side direction of the line beam, the line beam scanning optical system comprising:
a plurality of laser light sources disposed so as to be aligned in a direction corresponding to a long side of the line beam;
an optical deflector configured to displace a mirror on which laser light emitted from the plurality of laser light sources is incident, and to deflect the line beam in the short side direction;
a first cylindrical lens configured to converge the laser light emitted from the plurality of laser light sources, into substantially parallel light in a direction perpendicular to an alignment direction in which the laser light sources are aligned, and to cause the laser light to be incident on the mirror; and
a second cylindrical lens configured to condense the laser light emitted from the plurality of laser light sources, in the alignment direction in which the laser light sources are aligned, and to cause the laser light to be incident on the mirror, wherein:
the second cylindrical lens converges the laser light emitted from each of the laser light sources into one focal line, and
the mirror has a long shape in one direction and is disposed such that a longitudinal direction of the shape is parallel to a direction corresponding to the alignment direction.

* * * * *